Oct. 2, 1934.    J. A. BATA    1,975,532
APPARATUS FOR THE MANUFACTURE OF FOOTWEAR
Filed Nov. 23, 1932    10 Sheets-Sheet 4

Oct. 2, 1934.  J. A. BATA  1,975,532
APPARATUS FOR THE MANUFACTURE OF FOOTWEAR
Filed Nov. 23, 1932  10 Sheets-Sheet 5
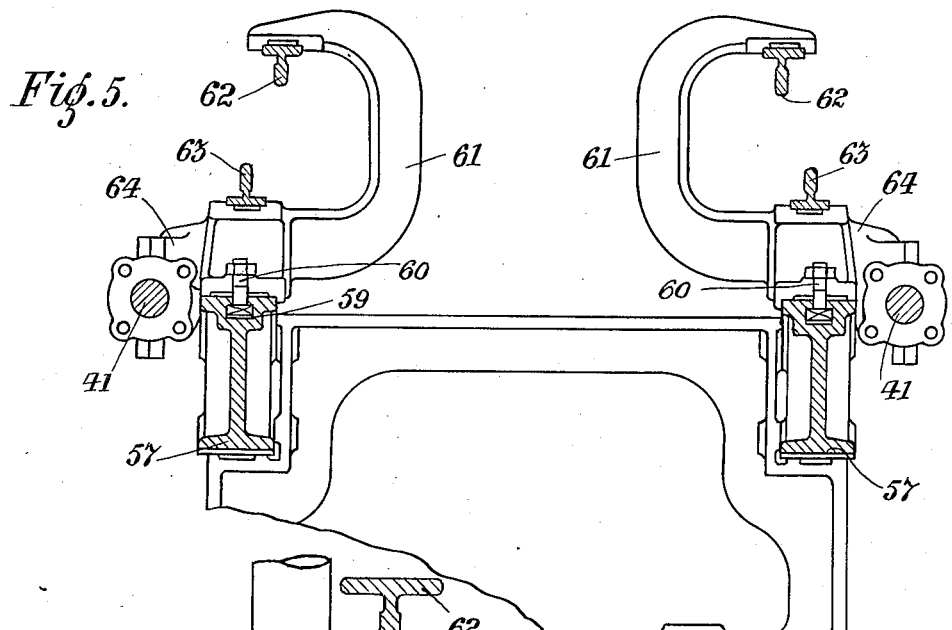
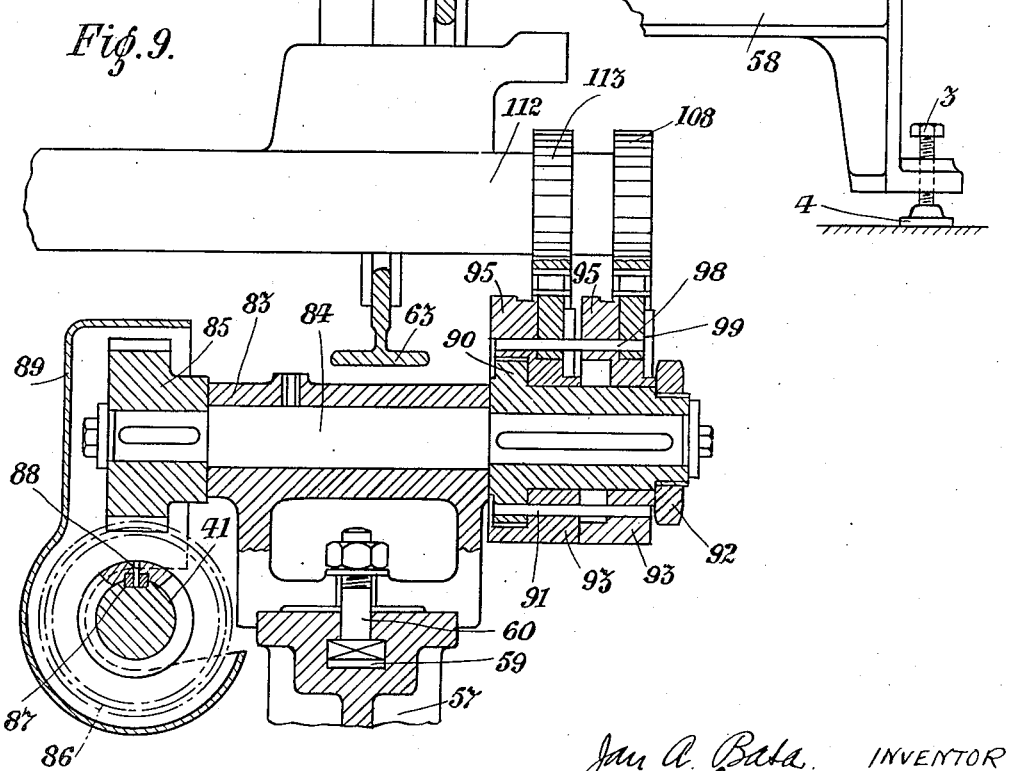

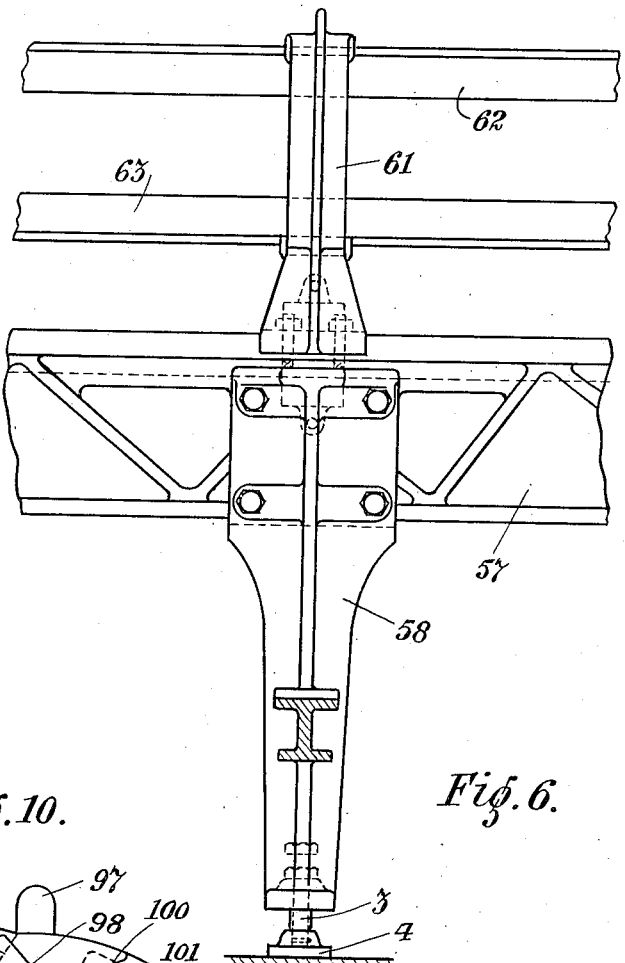
Fig. 6.
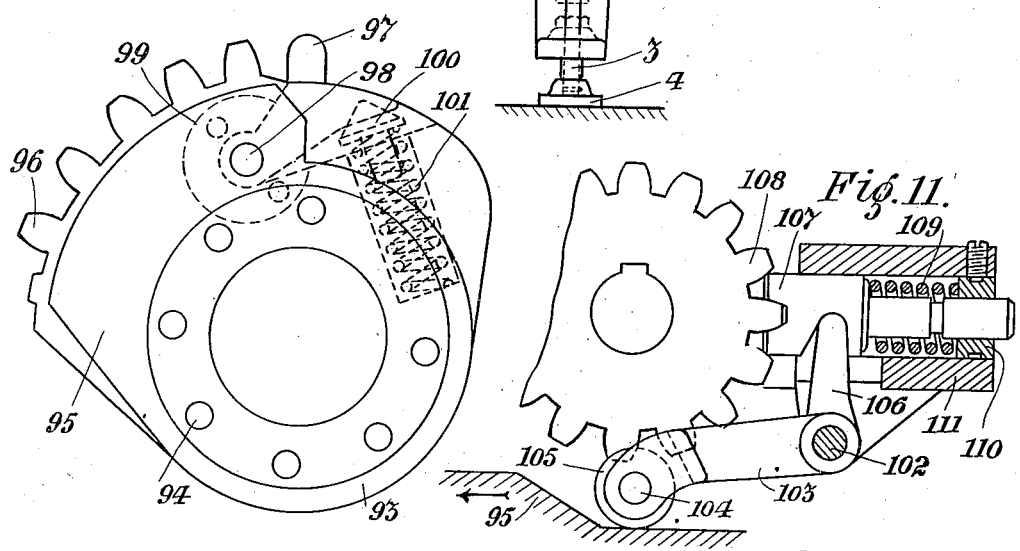
Fig. 10.
Fig. 11.

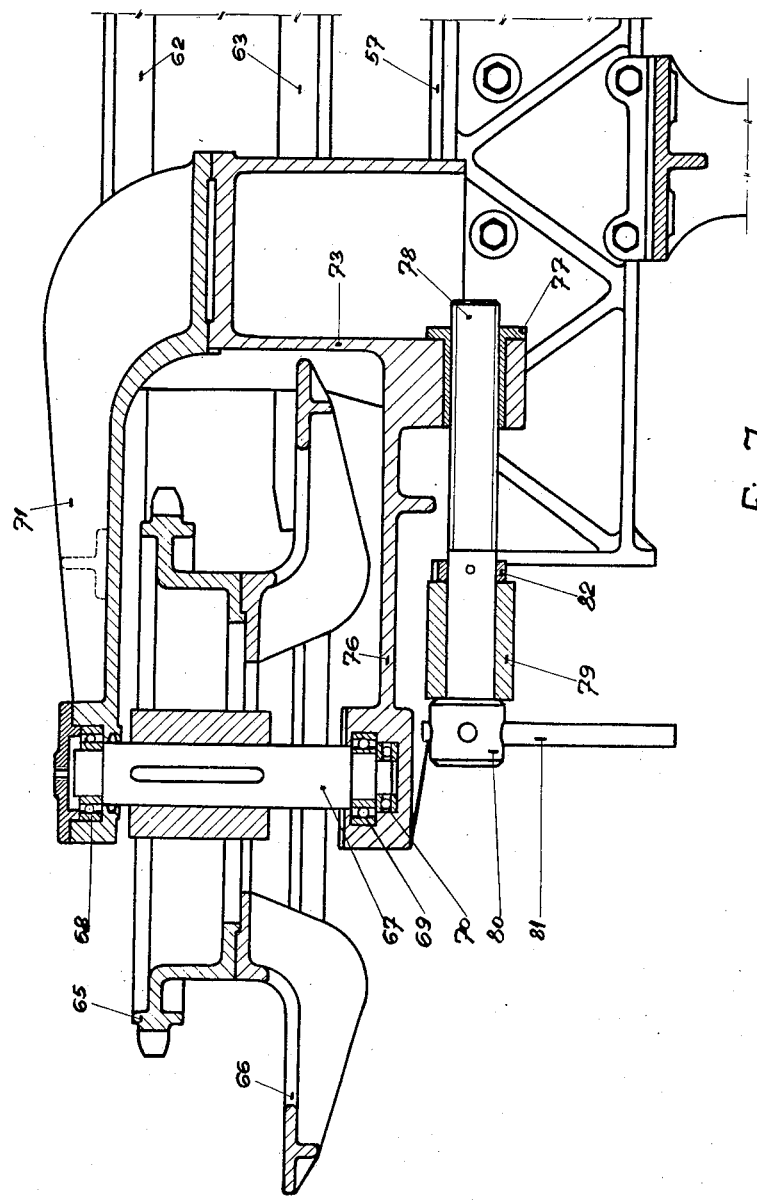

Oct. 2, 1934.  J. A. BATA  1,975,532
APPARATUS FOR THE MANUFACTURE OF FOOTWEAR
Filed Nov. 23, 1932   10 Sheets-Sheet 8

Oct. 2, 1934.　　　J. A. BATA　　　1,975,532
APPARATUS FOR THE MANUFACTURE OF FOOTWEAR
Filed Nov. 23, 1932　　10 Sheets-Sheet 9

Jan A. Bata INVENTOR.
per ATTORNEY.

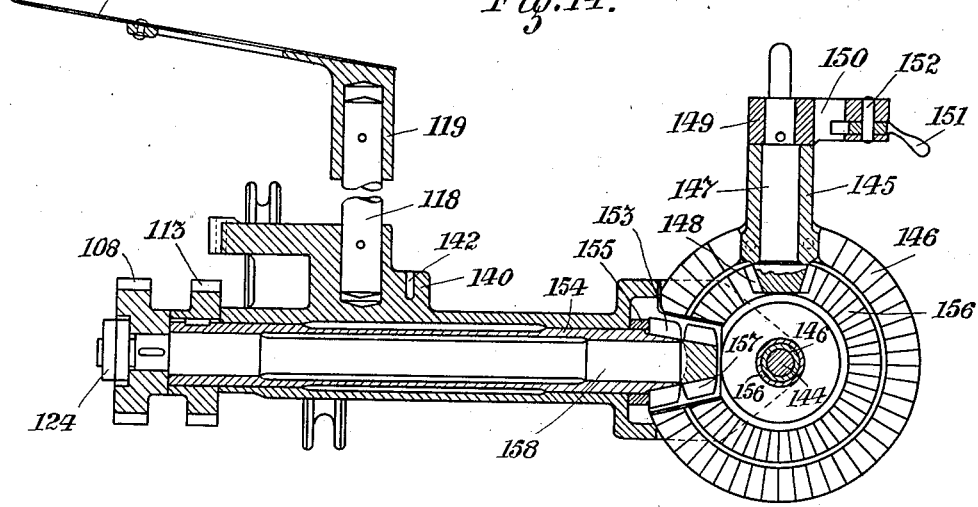
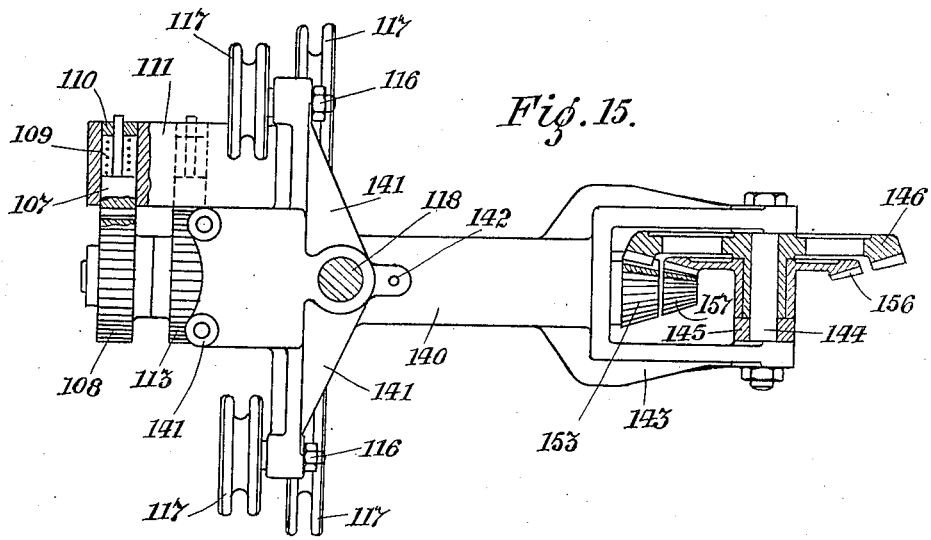

Patented Oct. 2, 1934

1,975,532

UNITED STATES PATENT OFFICE 1,975,532

APPARATUS FOR THE MANUFACTURE OF FOOTWEAR

Jan A. Bata, Zlin, Czechoslovakia

Application November 23, 1932, Serial No. 644,307
In Czechoslovakia December 4, 1931

12 Claims. (Cl. 12—1)

This invention relates to footwear manufacturing apparatus of the type set forth in my co-pending application Serial No. 644,305 in which lasts are adjustable into different positions on feed carriages which are adapted to be fed from one working position to another.

According to the present invention, such apparatus is provided with a feed track for the carriages which comprises a plurality of beams having rails thereon for the carriages and driving members from which the adjusting means for the lasts can be operated.

In accordance with a further feature of the invention, apparatus of the type stated is provided with transmission gearing whereby the feed means for the carriages is operated intermittently by a continuously operating driving means. Such transmission gearing may take the form of a Maltese-cross mechanism.

According to another feature of the invention the adjusting means for the lasts may be operated intermittently through a means connected to a continuously acting driving means. Such transmission means may comprise a pair of toothed members one of which is connected to the last adjusting means and, while normally held stationary, is adapted to be periodically intermeshed with the other toothed member which is rotated continuously by the driving means.

Preferably, the driving members from which the last adjusting means is operated comprise longitudinal shafts at each working side of the apparatus, toothed segments for operating the lasts being provided on the beams of the feed track, and gearing to drive such segments being provided on the longitudinal shafts at the different working positions into which the feed carriages move.

A combined feed and work treatment apparatus embodying the invention will now be described, by way of example, with reference to the annexed drawings, in which:—

Fig. 5 is a cross sectional view through the feed track;

Fig. 6 is a sectional view through stands of the feed track, showing in side elevation upper brackets;

Fig. 7 is a longitudinal sectional view through tensioning means;

Fig. 9 is a vertical section through the driving means for the segments;

Fig. 10 is a view of one example of segment with a spring-pressed tooth;

Fig. 11 is a sectional view of a device for connecting and disconnecting the drive for turning the lasts on the feed carriages;

Fig. 14 is a longitudinal section of another form of feed carriage, illustrating the bevel wheels;

Fig. 15 is a plan view of this feed carriage.

Figure 1:
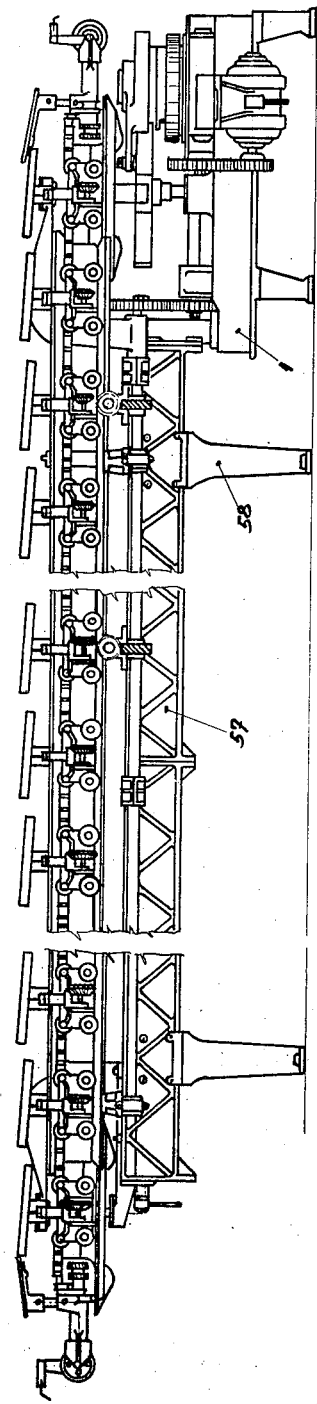
Fig. 1 is an elevation of the complete apparatus.

Referring to the drawings,

The combined feed and work-treatment apparatus shown in Fig. 1 consists firstly of driving means indicated at the right hand end of the figure, secondly of a feed track with carriages having lasts mounted thereon and tables serving for simultaneous supply of the necessary materials, and thirdly a tensioning device at the left hand end of the figure.

The driving means (Figs. 2, 3 and 4) consists of a table 1 which is fixed by means of screws on four legs 2, there being a positioning screw bolt 3 with nuts thereon in the foot-plate of each leg.

Figure 2:
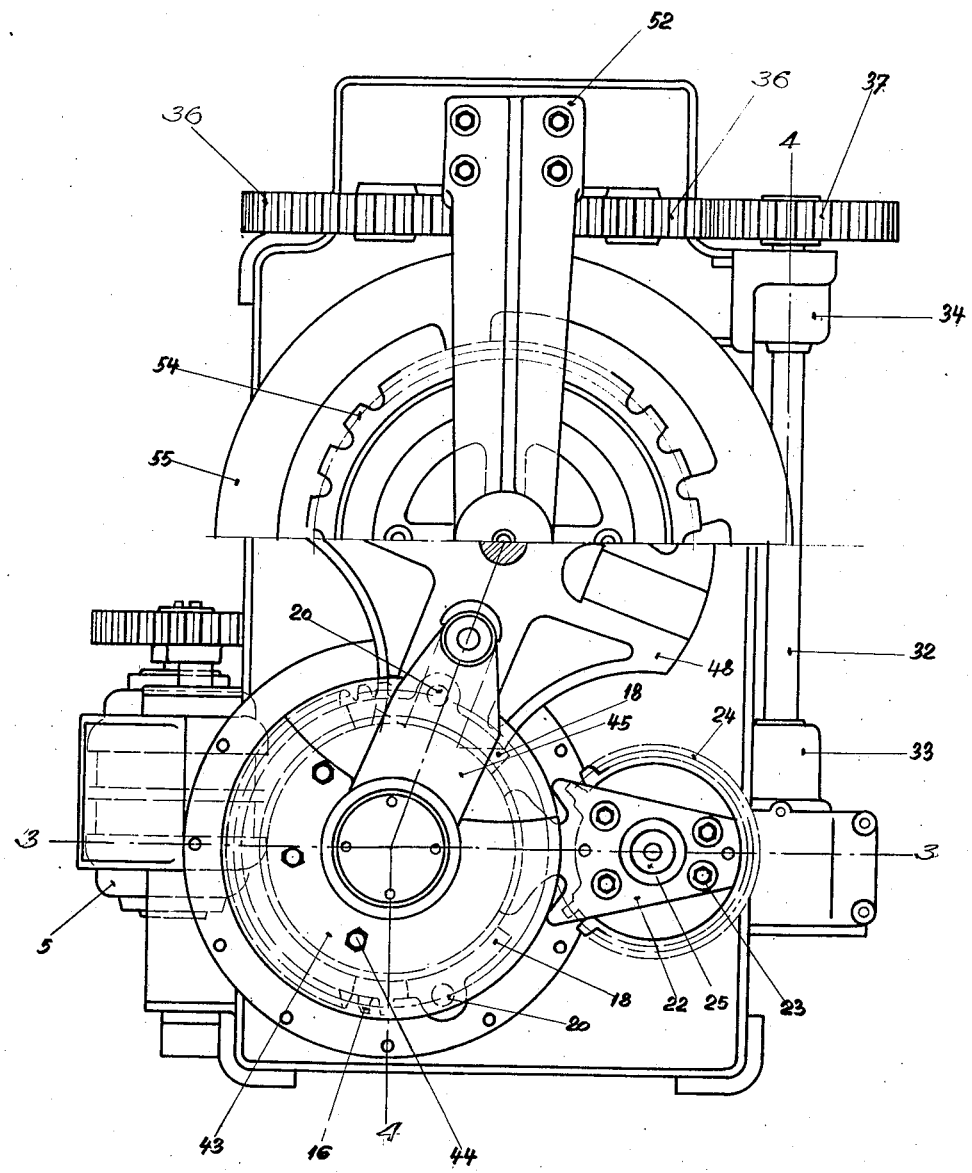
Fig. 2 is a plan view of the driving means for feeding the carriages along the feed track and for driving the segment mechanism.

The screw bolt 3 has a thrust plate 4 secured thereon by a pin. On the table 1 (Figs. 2 and 3) there is suspended an electric motor 5, on the shaft of which is provided a gear member 6 which engages in the larger toothed wheel 7 of a worm shaft 8. The worm of this shaft drives the worm wheel 9 screwed upon a nave 10. This nave is mounted on ball bearings 11, 12 carried by a vertical shaft 13 provided with a securing nut 14, the nave rotating within corresponding bosses in the table 10. On the nave 10 there is provided the nave 15 of a timing disc which on one side of its circumference has teeth 16 and on the other half has a guide 17 with upper and under arc members 18 and 19 secured thereon, two pins 20 being firmly secured in these arc members (Fig. 2). The guide 17 has a recess 21 on the whole of the semi-circumference left free of teeth, in which recess there engages a securing plate 22 which is secured by four screws 23 to the toothed wheel 24, of which the teeth do not go round its whole circumference. The toothed wheel 24 is carried by a vertical shaft 25 which is mounted in two radial ball bearings 26, 27 and in an axial ball bearing 28. The ball bearing 26 is mounted with its outer ring in the cover of the table 29 and the ball bearings 27, 28 in the table 1. On the shaft 25 there is a helically toothed wheel 30 which engages in the helically toothed wheel 31 on the shaft 32, which is mounted in the bearings 33, 34 cast in the table 1. In the bearing 34 (Fig. 4) there is mounted an axial ball bearing 35 which takes up the axial pressure arising from the helical wheels 30, 31. The toothed wheel 36 of the shaft 32 stands in engagement with the toothed wheel 37 of the short shaft 38 which is mounted in a bearing 39 in a pillar 40 cast on the table. The end of the shaft 38 is connected with the end of the shaft 41 by a muff coupling 42. The shaft 41 serves, as more clearly described hereinafter, for driving the segments operating the last turning mechanism of the feed carriage.

On top of the nave 10 there is fixed a carrier disc 43 which is firmly connected with the timing disc 15 and the nave of the worm wheel 10 by three long bolts 44. The carrier disc 43 has an arm 45 on the end of which is fixed a pin 46 by means of a nut, and this pin carries ball-bearing members 47 serving as engaging rollers of the Maltese-cross 48. The disc 43 alternately imparts a partial rotational movement to the Maltese cross 48 and holds or locks it temporarily against rotation, the form of the Maltese-cross being determined by the known requirements of this apparatus. The Maltese-cross 48 is keyed on a vertical shaft 49 which at its lower end is mounted in a radial ball bearing 50 and in an axial ball bearing 51 in the table 1, and at its upper end is likewise mounted in a radial ball bearing 53 in the eye of a bracket 52. On the upper end of the shaft 49 there is provided a chain feed wheel 54 on which a thrust disc 55 is screwed, the circumference of this disc serving for holding the feed carriages during their transfer from one working side of the track to the other.

Figure 3:
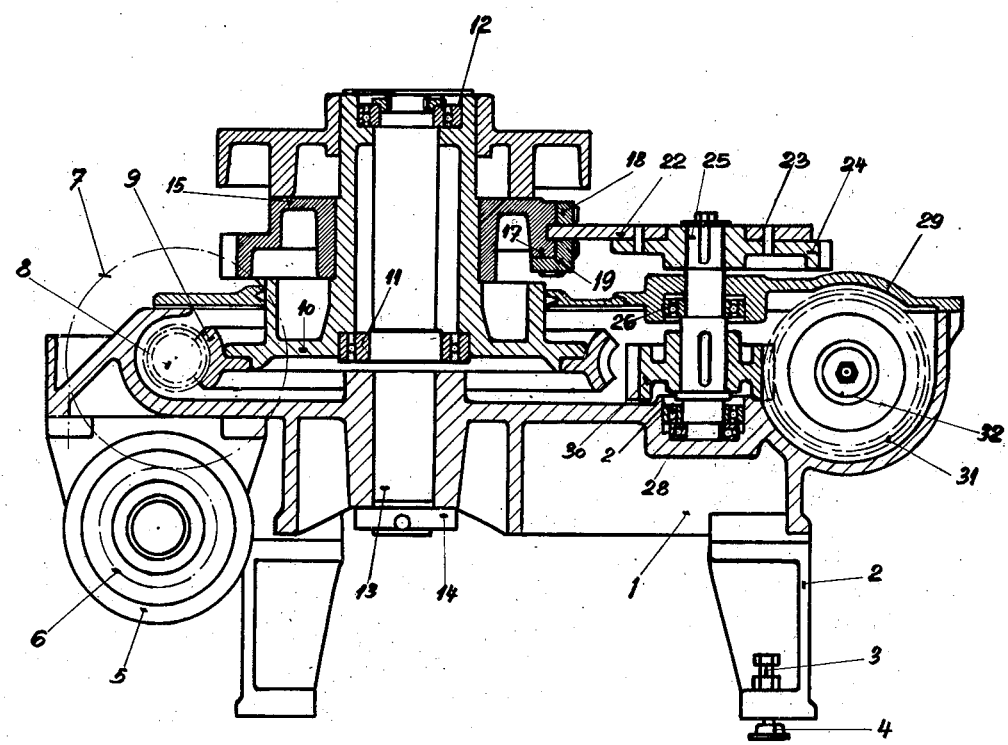
Fig. 3 is a sectional view through the driving means in the plane of the line 3—3 in Fig. 2.
Figure 4:
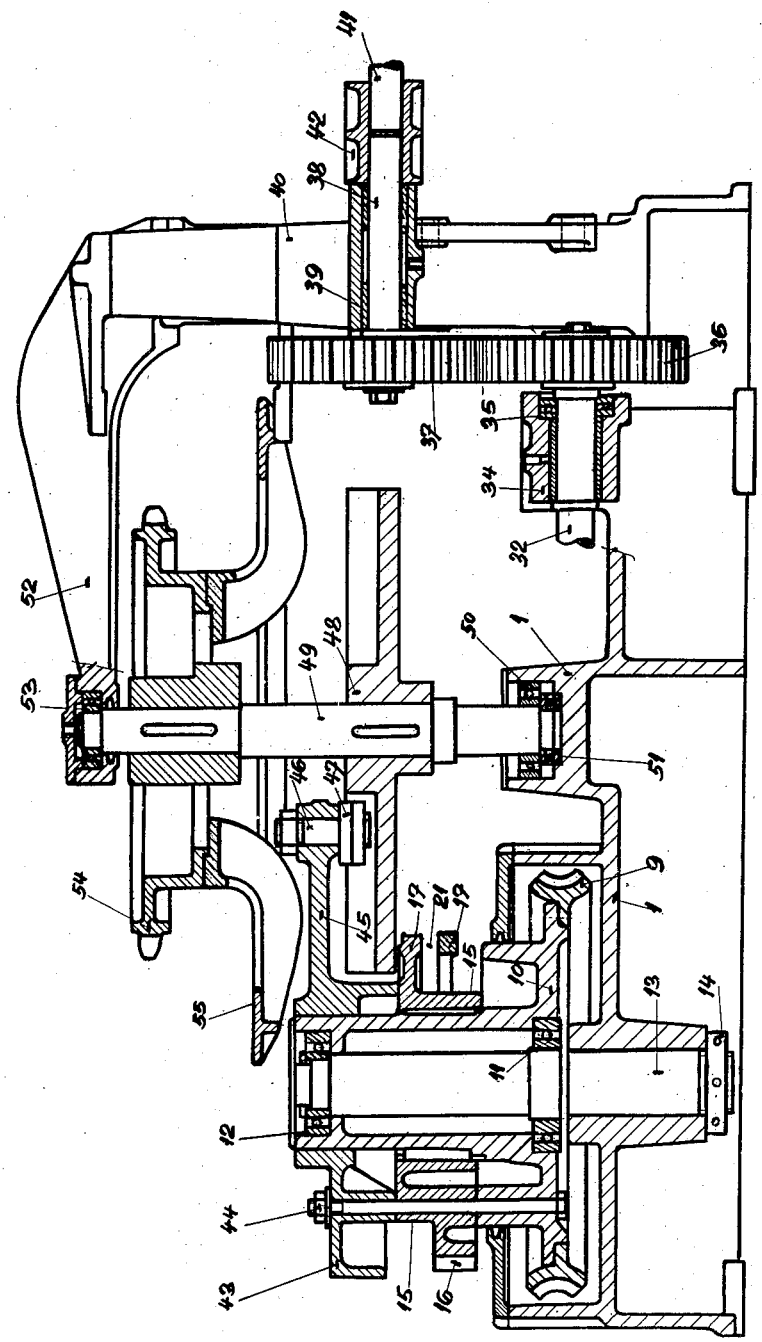
Fig. 4 is a sectional view through the driving means in the plane of the line 4—4 in Fig. 2.

The mode of operation of the driving means described in Figs. 2, 3 and 4 is as follows:—

The nave 10 with the discs 15 and 43 is driven continuously with a uniform velocity by the electric motor 5 through the reduction gearing 6 to 9. When the Maltese-cross 48 is being driven, the wheel 24 and shaft 25 are temporarily held or locked against rotation; because, as shown in Figs. 2 and 3, the plate 22 is then in register with the groove 21 in the circumference of the timing disc 17. As the timing disc 17 continues to turn, one of the pins 20 secured in the arc members 18, 19 comes into engagement with the plate 22 which is recessed at the places corresponding to the point of contact therewith of the pin 20, and thereafter from the instant of engagement, the plate 22 lies no longer stationary against the circumference 17 of the timing disc and the rotation of the plate 22 and accordingly the engagement of the teeth of the wheels 16, 24 takes place. When the engagement of the teeth is at an end, there then comes into engagement with the other side of the plate 22 the second pin 20 of the arc members 18, 19, the plate 22 being recessed also at this other side at the point of contact with the second pin 20. By this second pin, the end of the plate 22 is again moved into the groove 21, so that the rotation of the plate 22 is interrupted and in its final position the end of the plate is again in adjacency to the circumference of the timing disc 17 (Fig. 3). This interrupted drive of the plate 22, and also of the shaft 25, is therefore continually repeated. From this vertical shaft 25, the shaft 32 receives a discontinuous drive through the helical toothed wheels 31 from which the shaft 38 is driven by the transmission of the gear wheels 36, 37 through the muff coupling 42 connected with the shaft 41.

These shafts 41, 38 provided with the toothed wheel 37 are disposed on both longitudinal or working sides of the feed track (Fig. 5). Two intermediate toothed wheels 56 provide for their respective drives, these wheels being mounted in bearings of the pillar 40 of the table 1 (Fig. 2).

The feed track proper consists, as shown in Figs. 1, 5 and 6, of a number of longitudinal beams 57 which are connected with one another at the ends by several bolts or equivalent. Two of these parallel beams 57 are screwed to the sides of a common cast iron standard 58 in the foot plates of which there are provided positioning screws 3 having thrust plates 4.

The longitudinal beams 57 have each a groove 59 at the upper surface for the reception of screws 60. By means of these screws, brackets 61 are fastened to the beams 57, which brackets serve for application of upper rails 62 and under rails 63 of the feed track, the feed carriages travelling over such rails. Each bracket 61 has an integral block 64, in ball bearings in which the shaft 41 runs. The grooves 59 and screws 60 (see Fig. 5) serve for fastening the turning segments in the individual working positions and for the attachment of all necessary work-treatment machines and devices.

Figure 8:
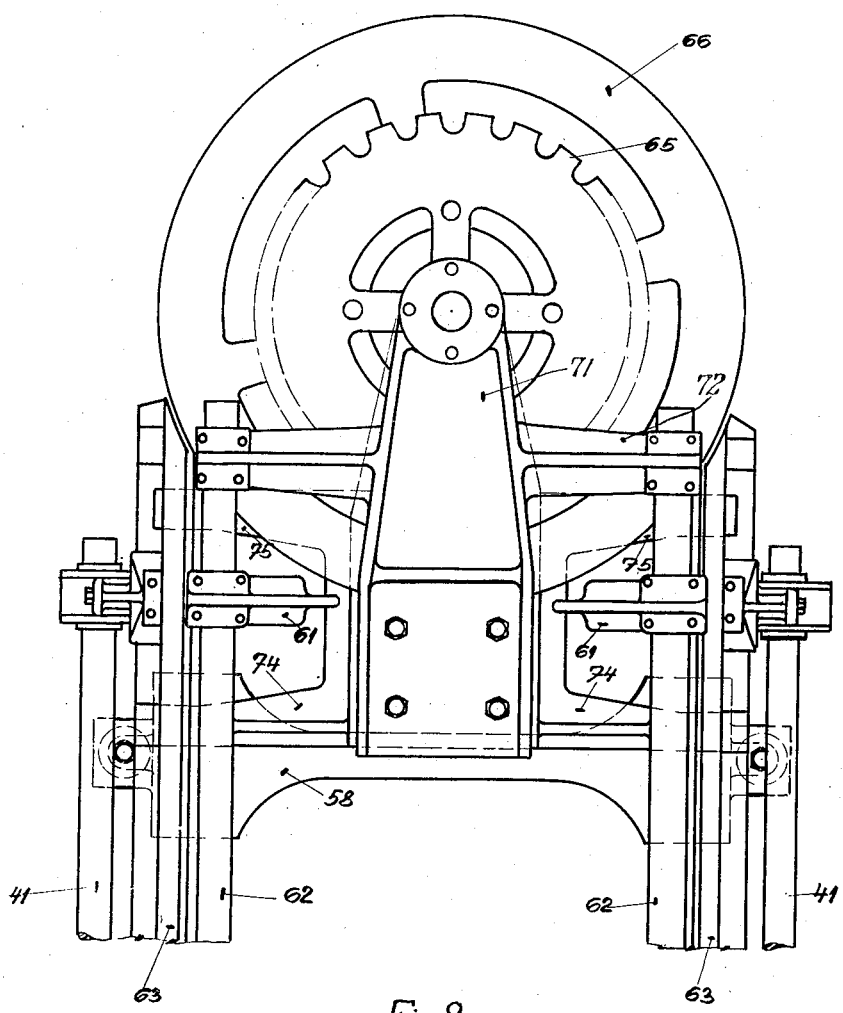
Fig. 8 is a plan view of the tensioning means.

The tensioning device (Figs. 7 and 8) consists of a chain wheel 65 on which is screwed a support disc 66 the circumference of which serves for holding the feed carriages during their transfer from one working side of the feed mechanism to the other side. The chain wheel 65 is mounted on a vertical shaft 67 which is carried at its upper end in a radial ball bearing 68 and at its lower end in a radial ball bearing 69 and an axial ball bearing 70. The outer ring of the upper bearing 68 is fitted in a corresponding recess of the cross-shaped bracket 70 which is provided with two arms 72 serving for fastening the upper rails 62 of the feed track and is screwed to the adjustable table 73. This table 73 has feet 74, 75 (Fig. 8) by means of which it is adjustable on the beams 57, in the grooves of which it is fixed in place by screws.

The table 73 has, in addition, an arm 76 in the boss of which ball bearings 69 and 70 are provided, such arm 76 having also an integral block for a bush 77. This bush is secured in place by screws passing through its flange and is screw-threaded internally so that the tension screw 78 is movable therein, this screw 78 being mounted in a bearing 79 which is connected with two side arms on the vertical ends of the adjoining terminal beams 57. The tension screw 78 terminates in a cylindrical head 80 provided with holes for a turning rod 81 and is secured at its inner end by a positioning ring 82.

The mechanism for the turning segments (Figs. 9, 10 and 11) consists of brackets 83 which are firmly held on the longitudinal beam 57 of the feed track in each individual working position by means of two screws 60 fixed in the groove 59. In a bearing of the bracket 83, a shaft 84 is turnably mounted on one end of which there is a helically toothed wheel 85 engaging a second helically toothed wheel 86. In the boss of the wheel 86, a key 87 secured by a pin 88 is provided, corresponding to the groove running the whole length of the shaft 41, so that the wheels 86 can always be slid along such shaft in accordance with the required position of the brackets 83 on the carrier 57 of the feed track. On the bracket 83 there is screwed a cover 89 for the helically toothed wheels 85, 86.

At the inner end of the shaft 64, a sleeve 90 is keyed, which sleeve has in its flange adjacent the bracket 83 ten holes equally spaced from one another for receiving a common pin 91. Such sleeve 90 has also a securing nut 92 at its end.

One or two toothed segments 93 will always be provided on the sleeve 90 according to the requirements of the carriage drive, which segments consist of a body provided with a runway surface 95 and with seven longitudinal holes 94 set at 45° from one another and also having teeth 96 and a spring-pressed tooth 97. This spring-pressed tooth is mounted in a corresponding recess of the body of the segment on a pin 98 and is secured against sideways movement by an insert 99 secured in position by screws. By the pin 100 and the coil spring 101 the tooth 97 is pressed into an engaging position. On each feed carriage, the detailed construction of which can be different according to requirements, there is a lever 103 turnably mounted on a pin 102, at one end of which, on a pin 104, there is turnably mounted a roller 105, and at the other end of which there is a finger 106 engaging in a fixing stop 107. The stop 107 has at its end a groove corresponding to one of the teeth 108. A spring 109 presses the stop 107 towards the teeth 108, this spring bearing on a thrust ring 110. Both the pin 102 of the lever 103 and the stop 107 are mounted in a pocket 111 cast on the body of each feed carriage 112 (Fig. 13). Each feed carriage has its own toothed wheels 108, 113 (Fig. 12), and the wheel 113 in each case is secured by a similar fixing stop 107 and lever 103.

As soon as the feed carriage comes to a working position in which the segment mechanism is mounted on a bracket 83, the movement of the helically toothed wheels 85, 86 is transmitted by the rotation of the shaft 41 to the shaft 84 and the surface 95 of the segment (Figs. 10 and 11) comes into contact with the striker roller 105, which, with the aid of the lever 103, brings the pin 107 out of engagement and holds it out so long as the engagement of the teeth 96 with the toothed wheel 108 or 113 continues. The engagement of the fixing stop 107 in the teeth of the wheel 108 or 113 must continue as long as the segment teeth 96 are still in engagement with the wheel 108 or 113, for which reason the end or trailing tooth of the segment is constituted by the spring-pressed tooth 97, so that the segment can turn out of engagement after the stop 107 has snapped into engagement. In order that the beginning of the engagement of the segment teeth 96 may be accurately adjusted, the flange of the sleeve 90 is provided with ten holes for the common key or pin 91 and the segment body is only provided with seven holes. This key or pin 91 is then pushed only into the holes which register in the necessary relative positions of the sleeve 90 and segments 93.

The length of the runway surface 95 of the segment and the set of teeth 96 can be different according to the length of time the mechanism of the feed carriage is to be driven. The helically toothed wheels 85, 86 have left and right pitches corresponding to the direction in which the feed carriage mechanism is to be turned.

In the drawings (Figs. 12, 13, 14 and 15) two constructional forms of feed carriage for the feed mechanism described in this specification are illustrated.

Figure 12:
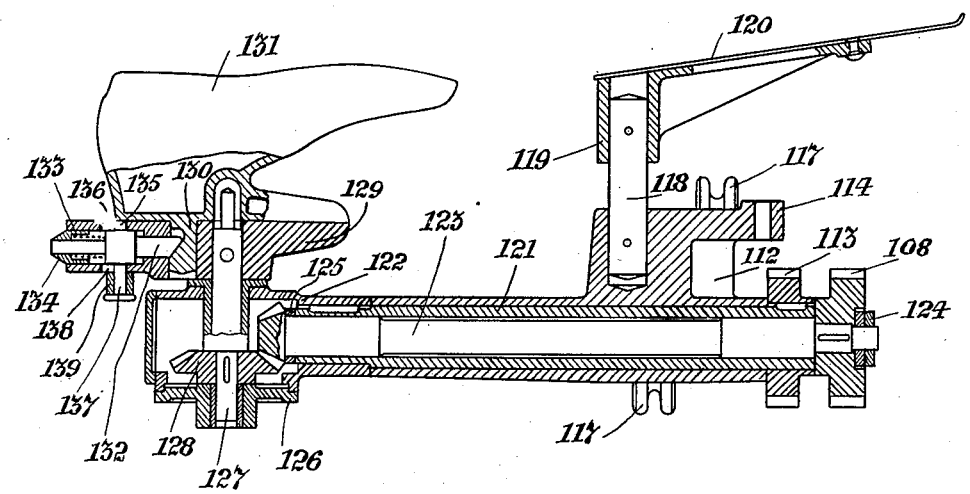
Fig. 12 is a longitudinal section of one form of feed carriage.
Figure 13:
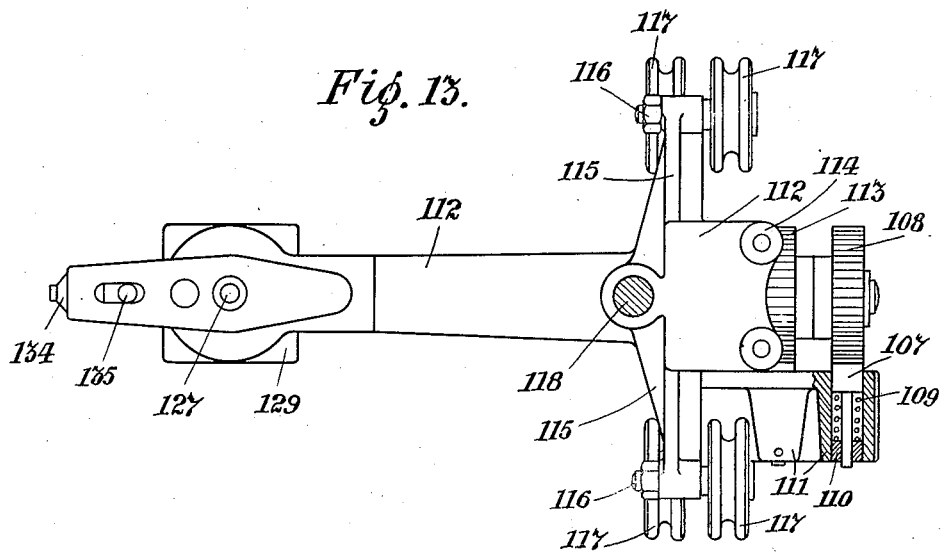
Fig. 13 is a plan view of the said feed carriage.

The feed carriage shown in Figs. 12 and 13 consists of a body 112 which has a bracket 114 provided with openings for holding the feed chain and two side parts 115 in which, on corresponding pins 116, four travelling wheels 117 are turnably mounted, each wheel having an inner ball bearing. In the body 112 of the feed carriage, a rod 118 is mounted, on the upper end of which a holder 119 is fitted and secured by a pin. On this holder 119 the plate of the table 120 is riveted.

On one side part 115, two pockets 111 are cast, in which the fixing stops 107 are mounted with their springs 109. In the body 112 of the feed carriage, a hollow shaft 121 is turnably mounted, on one end of which shaft a toothed wheel 113 is provided, whilst the other end carries a gear box 122. A solid shaft 123 is mounted inside the hollow shaft 121. One end of the shaft 123 carries the toothed wheel 108 secured in position by two nuts 124, the other end of the said shaft being constructed as a bevel wheel. Behind such bevel wheel a spacing ring 125 is provided.

In the cover 126 and in the upper part of the gear box 122 a vertical shaft 127 is mounted, on which the bevel wheel 128 is carried and the last holder 129 is secured by a pin. The holder 129 is provided with a hole for a pin 130 of a last 131, the pin 130 having a notch in which the correspondingly shaped end of a fixing stop 132 engages. This stop is pressed into the recess by means of a spring 133 abutting on a member 134, and has a pin 135 which is guided in a longitudinal opening 136. The end 137 of the pin 135 projects through a similar opening 138 and has a roller 139 adapted to strike against a cam or stop fixed on the frame of the apparatus at the point where automatic release of the last 131, is desired, i. e. at the working position wherein the last with the finished shoe is to be replaced by an empty last.

If the shaft 123 is first turned by a segment through the wheel 108, the wheel 113 meanwhile being secured by the stop 107, then the shaft 127 rotates and thereby the last 131 rotates around its vertical axis. When the shaft 121 is turned by the segment mechanism through the wheel 113, the wheel 108 being secured by the pin 107, then the whole holder 129 turns along with the last around the horizontal axis of the hollow shaft 121.

The feed carriage (Figs. 14 and 15) is constructed for the manufacture of shoes with high shanks in which the last cannot be so conveniently turned as with other shoes.

This feed carriage consists of a body 140 which has two side parts 141 with openings for the reception of the feed chain, as well as a box for the insertion of a rod 118 secured therein by a pin, on the upper end of which rod the holder 119 with its plate 120 is secured. In addition, a bore 142, provided in the feed carriage, serves for the reception of an upright carrying a receptacle containing colouring or like materials. On the four pins 160 four travelling wheels 117 running on ball bearings are fixed.

A fork 143 is cast on the carriage body 140 and a spindle 144 is fixed in such fork. A boss 145 (Fig. 14) has a depending apertured prong turnably arranged on the spindle 144 (Fig. 15) and is connected at its side remote from such prong to a corresponding projection on the circumference of the bevel wheel 146 (Fig. 14), this bevel wheel not having teeth over its whole circumference. In the boss 145, a spindle 147 is fixed which has a bevel wheel 148 at one end and a last holder 149 secured by a pin to its other end. This holder has a hole 150 for the insertion of the pin about the axis of which the last is adapted to turn, which pin is secured by a fixture member 151 turnable around the pin 152.

The bevel wheel 146 is turnably mounted on a spindle 144 and engages a bevel wheel 153 formed at one end of a hollow shaft 154. The shaft 154 is mounted in the body 140 of the feed carriage and carries at its other end a toothed wheel 113. Behind the bevel wheel 153 a distance ring 155 is provided. The bevel wheel 148 of the spindle 147 engages a bevel wheel 156 turnably mounted on the nave of the bevel wheel 146 (Fig. 15). The bevel wheel 156 engages the bevel wheel 157 formed on one end of the solid shaft 158. At the other end of the shaft 158 there is a toothed wheel 108 secured by two nuts 124 (see Fig. 14).

When the segment mechanism turns the toothed wheel 108 of the shaft 158 and the other toothed wheel 113 meanwhile remains fixed by the pin 107, the bevel wheels 157, 156, 148 and the spindle 147 are turned and rotate the last about the vertical axis of the spindle 147.

When the segment mechanism turns the toothed wheel 113 on the shaft 154, the toothed wheel 108 meanwhile remaining fixed by the pin 107, the bevel wheel 146 together with the boss 145 is then turned by the bevel wheel 153 around the axis of the spindle 144, whilst at the same time, the bevel wheel 157 being immovable, the spindle 147 also begins to rotate and effects rotation of the last around the axis of such spindle 147.

When two similar adjacent segments are used, these turn the toothed wheels 108, 113 of the respective shafts 158, 154 simultaneously, thereby turning the bevel wheels 146, 156. Consequently the last turns around the horizontal axis of the spindle 144 without turning simultaneously around the axis of the spindle 147.

I claim:—

1. For footwear manufacturing apparatus having lasts mounted on carriages adapted to be fed into different working positions, the combination of mechanism for alternately transmitting to the carriages feed-motion from one working position to another and holding the carriages temporarily stationary in working position, mechanism for effecting adjustment of the lasts into different positions on the carriages standing in working position, means whereby the said mechanisms are periodically driven alternately so that a full rotation of the said driving means is utilized to produce only a partial rotation of the driven mechanisms, and means for holding the adjustment-effecting mechanism stationary while said other mechanism is being driven.

2. For footwear manufacturing apparatus having lasts mounted on carriages adapted to be fed into different working positions, the combination claimed in claim 1, comprising Maltese-cross means for alternately feeding and holding the carriages.

3. The combination claimed in claim 1, comprising transmission gearing having a pair of toothed members, means connecting one of said toothed members to said driving unit, means for periodically inter-meshing the other toothed member with said first toothed member, means for holding said second toothed member stationary relative to said first toothed member between said periodic interengagement, and means operatively connecting said second toothed member to the adjusting means for said last.

4. For footwear manufacturing apparatus having lasts mounted on carriages, the combination of a feed track, toothed segment means at different working positions along said track, shaft means on said track, a driving unit, means for driving said shaft means from said driving unit intermittently, means for driving said segment means from said shaft means, toothed means on said carriages adapted to engage with and be driven by said segment means, and means whereby said last is adjustable by said toothed means.

5. The combination claimed in claim 4 comprising shaft means for driving the segment means at the working positions, a feed track for supporting said segment means together with said transmission means and shaft means, and means whereby said segment means, transmission means and shaft are adjustable to any position along said track.

6. The combination claimed in claim 4 comprising locking means for holding said toothed segment means normally fixed, and means rotatable with said segment means for releasing said locking means periodically to permit adjustment of the last.

7. The combination claimed in claim 4 comprising a pair of toothed segments, a gear wheel on said carriage adapted to engage one of said segments so as to rotate said last about an axis, a second toothed wheel on said carriage adapted to engage the other segment so as to rotate said last about another axis.

8. The combination claimed in claim 4 comprising a pair of toothed segments, a toothed wheel on said carriage adapted to be engaged by one of said segments so as to rotate said last about an axis, a second toothed wheel on said carriage adapted to rotate said last about another axis, and means whereby said toothed wheels are adapted to be rotated simultaneously by said segments.

9. For footwear manufacturing apparatus having lasts mounted on carriages, the combination of a carriage feed track, a plurality of pairs of toothed segments, each pair at different working positions along said track, a pair of shafts arranged longitudinally on said track, a driving unit, means for driving said longitudinal shafts from said unit intermittently, a transverse shaft on said track for each of said pairs of segments, helical gearing adapted to drive said transverse shaft from one of said longitudinal shafts, toothed wheels on said carriages adapted to engage with and be driven by said segments, and means whereby said last is adjustable about two different axes by said toothed wheels.

10. The combination claimed in claim 9 comprising a stop adapted to engage said toothed wheel on said carriage, spring means whereby said stop is pressed normally into locking engagement with said toothed wheel, cam means rotatable with the segment inter-engaging said toothed wheel, and striker means whereby said cam is adapted to disengage said stop from said toothed wheel periodically.

11. The combination claimed in claim 9 comprising a hollow shaft for the toothed wheel adapted to effect rotation of the last about one axis and a concentrically arranged solid shaft for the toothed wheel adapted to effect rotation of the last about the other axis.

12. The combination claimed in claim 4 comprising an extended normally upright support, means whereby a last for shoes with long shanks is rotatable relative to said support, and means whereby said support and last together are rotatable about an axis parallel to the direction of movement of said carriage.

JAN A. BATA.